May 19, 1970 W. B. NICHOLS 3,512,325

WEDGE ASSEMBLY

Filed June 6, 1969

WALTER B. NICHOLS, INVENTOR

BY Browne, Schuyler & Beveridge

ATTORNEYS

United States Patent Office 3,512,325
Patented May 19, 1970

3,512,325
WEDGE ASSEMBLY
Walter B. Nichols, 77 Lounsbury Road,
Trumbull, Conn. 06611
Continuation-in-part of application Ser. No. 631,799,
Apr. 18, 1967. This application June 6, 1969, Ser.
No. 831,154
Int. Cl. E04b 1/60; F16b 5/06
U.S. Cl. 52—584                     12 Claims

ABSTRACT OF THE DISCLOSURE

A wedge assembly for securing two structural elements together including an upstanding stud fixed to one of the elements, a pressure block loosely mounted on the stud and a wedge loosely mounted on the stud above the pressure block. In securing the other element, it is placed between the pressure block and the first element and then the wedge is oriented transverse to the pressure block and hammered to wedge the pressure bar downwardly on the second element to secure it with respect to the first element. A stop on the extremity of the stud contains the wedge on the stud and causes it to exert a downward force on the pressure block for securing the elements. Interengaging teeth formed on the mutually engaging surfaces of the wedge and pressure block, maintain them to firm wedging engagement.

RELATED APPLICATIONS

This application is a continuation-in-part of my prior copending U.S. patent application Ser. No. 631,799 filed Apr. 18, 1967 and entitled Prefabricated Building and Method of Erecting Same.

SUMMARY OF INVENTION

The present invention generally relates to a novel wedge assembly for securing two structural elements together. The present invention also relates to a novel joint and structural members incorporating the wedge assembly.

In the field of prefabricated buildings and similar structures, there is a demand for a fastener or securing device that may be quickly and easily employed in the field with a minimum of skill and without the use of special tools. Ideally it is preferable that such a device be reusable and moreover that it be capable of assembly in the shop during fabrication of the associated structural member to which it is applied. One of the aims of the present invention is to provide a novel wedge assembly that will achieve the foregoing advantages.

A further object of the present invention is to provide such a wedge assembly that achieves highly effective securement and without requiring nails, screws, bolts or similar fasteners heretofore employed. Included herein is such a wedge assembly that may be disassembled and subsequently reused on repeated occasions.

A further object is to provide a wedge assembly that may be permanently incorporated in a structural element such as a beam for purposes of securing another element to the beam during erection of a building in the field. Included herein is such a wedge assembly that is self adjustable so that it will secure elements of various sizes to the beam.

A still further object is the provision of a novel structural joint as well as a novel structural rib which incorporate the aforedescribed wedge assembly.

Yet another object of the present invention is to provide a wedge assembly particularly suitable for use in a prefabricated building such as disclosed in my prior copending application identified above while having other uses making it an extremely versatile securement device.

A still further object is to provide such a wedge assembly that is feasible to manufacture and employ commercially while having a durable construction that will withstand rugged use over long periods.

In one embodiment of the present invention, the wedge assembly includes a stud secured to a primary structural element to which a second element is to be secured. The stud projects from a face of the first structural element and loosely receives a pressure block through means of an aperture in the latter. Above the pressure block there is positioned on the stud, a wedge member that is slidable along and transversely of the stud by means of an elongated slot formed in the wedge member. To contain the wedge member and pressure block on the stud, a stop is provided at the extremity of the stud.

In use, the second element which is to be secured to the first element is placed between the pressure block and the first element and then the wedge member is oriented transversely of the pressure block and hammered to wedge the pressure block downwardly into firm engagement with the second element which in turn is forced and secured against the first element. In order to insure that the pressure block and wedge member are retained in their pressure applying position, a series of interengaging teeth are formed in their mutually contacting faces. Additionally, to facilitate assembly of the stud to the first structural element so that it projects from the latter a predetermined distance, a spacer tube is placed about the projecting portion of the stud and extends from the first structural element to the stop at the end of the stud. This tube also serves as a bearing sleeve for the wedge member and pressure block. To release the wedge assembly from its operative pressure applying position, the wedge member is merely hammered to rotate it to disengage the teeth and release the wedging action on the second element which then may be removed. As an alternative, the pressure block may be hammered to rotate it out of transverse relationship with the wedge to release the clamping engagement. Upon reassembly of the structural elements, the wedge assembly may be used again in the same manner described above and without adjustment. In the illustrated embodiment, the stud is in the form of a bolt having a head with a washer assembled below it forming the stop. The wedge member and pressure block are received on the stud about the spacer tube, and a pair of building panels are interposed between the pressure block and the top face of the rib on opposite sides of the stud. The rib is provided with several wedge assemblies spaced along the top surface thereof with the pressure block of each assembly overlying the panels in transverse relation to the rib.

To apply continuous and uniform pressure along the edges of the panels, a pair of elongated pressure bars are inserted between the pressure blocks and the upper faces of the panels preferably with elongated sealing strips located between the pressure bars and the upper faces of the panels. In securing the joint, the wedge members of each assembly are oriented transversely to the pressure blocks and then hammered to wedge the associated pressure blocks downwardly into firm engagement with the pressure bars which in turn apply pressure on the panels to secure them against the rib. The teeth between the wedge members and pressure blocks serve to retain them in their operative pressure applying positions against dislodgment, as may be otherwise caused by vibrations or other forces acting on the structure.

When it is desired to release the wedge assemblies for example during disassembly of a prefabricated building, the wedge members on the pressure blocks are merely hammered in rotation to release the wedging action on the pressure blocks whereupon the pressure bars and panels may be easily removed from the rib.

Other objects and advantages will become apparent from the following more detailed description taken in conjunction with the attached drawings in which.

DETAILED DESCRIPTION

Figure 1:
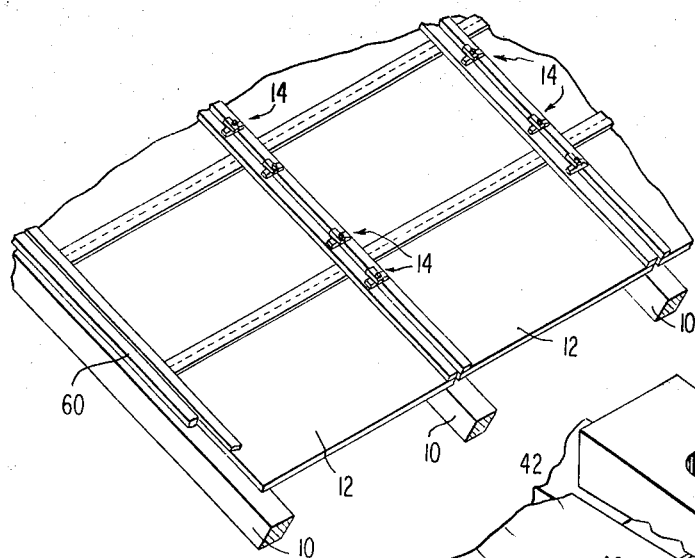
FIG. 1 is a fragmental perspective view of a portion of a building structure embodying the present invention.

Referring now to the drawings in detail, there is shown in FIG. 1 a portion of a prefabricated building such as disclosed in my above-identified U.S. application, including a plurality of primary support beams or ribs 10 with panels 12 supported on and extending between the ribs. The panels 12 per se and the remaining portion of the building which is not shown, form no part of the present invention. However, a more detailed description of these parts may be obtained upon reference to the specification and drawings of my above-identified application which is incorporated by reference into this application.

Figure 4:
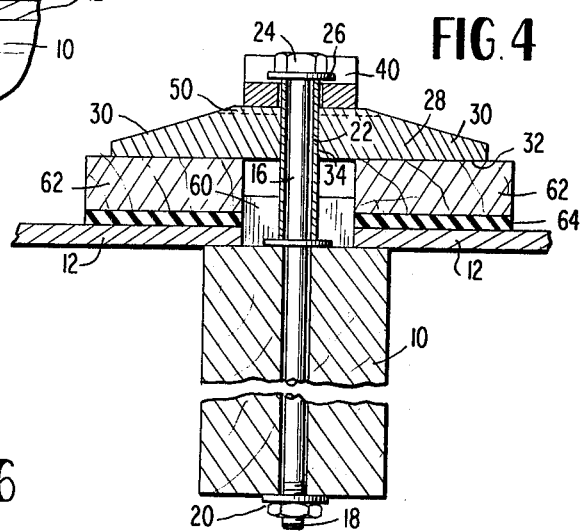
FIG. 4 is a cross sectional view taken generally along lines 4—4 of FIG. 3.

A plurality of wedge assemblies generally designated 14 embodying the present invention are employed to secure the panels on the ribs. In the specific embodiment shown, each wedge assembly includes a stud formed by a bolt 16 fixed in the rib with a portion projecting upwardly from the top surface of the rib as best shown in FIG. 4. The bolt may be secured in the rib in any suitable manner such as by threads 18 and a corresponding nut and washer assembly 20 installed at the bottom face of the rib. For a purpose to become apparent subsequently, a spacer tube 22 formed of any suitable material such as steel or alloy is inserted on the bolt prior to installation in the rib so that spacer tube 22 projects from the face of the rib upwardly to the head 24 of the bolt. Additionally a washer 26 is interposed between the upper end of the spacer tube and the head of the bolt.

Mounted for slidable and rotatable movement on the spacer tube is a pressure block 28 which may be made from any suitable material preferably block aluminum and which in the embodiment shown has a generally rectangular configuration in plan view. The opposite ends on the top surface of the pressure block are chamfered at 30 while the bottom face 32 of the pressure block has a flat rectangular shape. Pressure block 28 receives the stud and spacer tube through means of any suitable aperture 34 which may have a circular shape.

Figure 2:
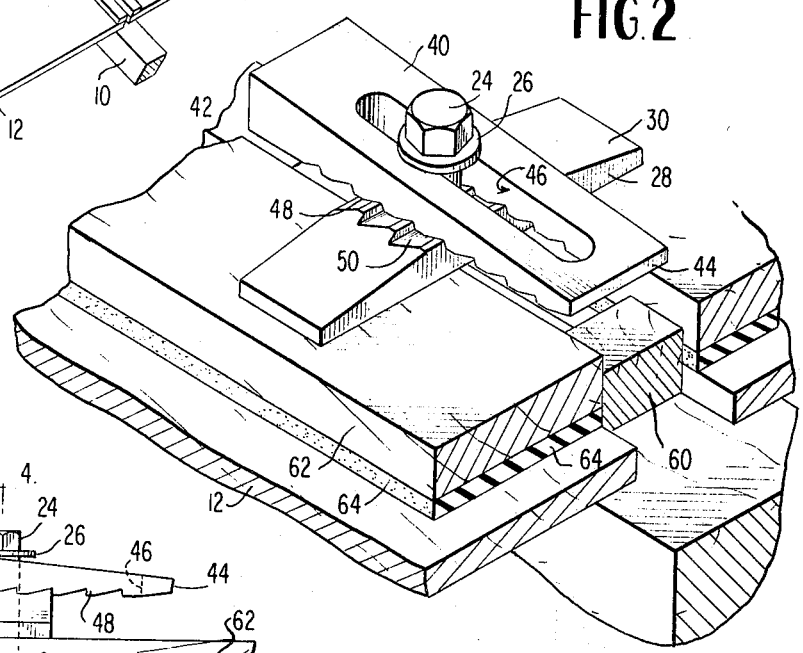
FIG. 2 is an enlarged, fragmental, perspective view of a joint included in the structure of FIG. 1 and incorporating a wedge assembly embodying the present invention.

Above the pressure block there is slidably and rotatably mounted a wedge 40 preferably formed of aluminum block material. The wedge narrows in cross section from a wide, flat faced end 42 to a narrow end 44 and has a generally rectangular outline when viewed in plan. An elongated slot 46 formed in the wedge receives the stud and spacer tube as shown in FIG. 2.

Figure 3:
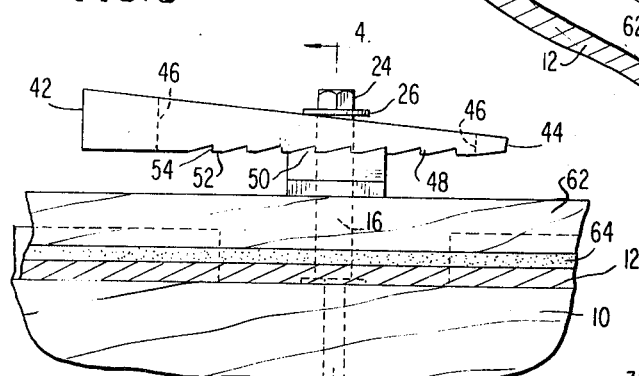
FIG. 3 is a side elevational view of the joint shown in FIG. 2 and with portions shown in cross section.

In order to retain the wedge and pressure block in operative position as will be further described, a plurality of teeth 48 and 50 are formed in the mutually engaging faces of these members. Teeth 48 formed in the wedge extend transversely thereof in longitudinally spaced locations throughout a substantial portion of the wedge length. Preferably teeth 48 have planar chamfered portions 52 that extend generally at right angles to vertical side portions 54 of the teeth as shown in FIG. 3. Teeth 50 formed in the pressure block 28 have a shape complementary to the wedge teeth, however they extend longitudinally of the pressure block at locations spaced transversely of the pressure block as best shown in FIG. 2.

From the above description it will be apparent that pressure block 28 and wedge 40 are assembled about the spacer tube prior to installing bolt 16 in the rib. As is apparent from the drawings, the width of wedge slot 46 is less than the diameter of washer 26 which thus will permanently maintain the pressure block and wedge on the stud.

In order to form the joint between ribs 10 and panels 12 shown in FIG. 1, and in accordance with another aspect of the present invention, a plurality of elongated spacer strips 60 are fixed on the top faces of the ribs along the center line thereof and between the studs 16. Panels 12 are then placed on the top faces of the ribs between the latter and pressure blocks 28 which are raised in order to allow insertion of the panels in the foregoing manner. This latter operation is facilitated by spacer strips 60 since the panels are moved transversely of the ribs until they engage the opposite sides of the spacer strips which thus insure that the edges of the panels are properly seated on the rib faces and with equal area contact between the panels and the rib faces on opposite sides of the spacer strips.

A pair of elongated pressure bars 62 are then inserted under pressure blocks 28 in overlying and continuous contact with the ends of the panels 12 as shown in FIG. 1. Pressure bars 62 may have a rectangular cross section and be formed from any suitable material such as wood. Positioning of the pressure bars 62 is also facilitated by spacer strips 60 which abut the inner sides of the pressure bars as shown in FIG. 4.

In order to provide a seal as well as a degree of resilience for securing the panels in place through the wedge assemblies, a pair of elongated continuous strips 64 of resilient rubber, plastic or composition material is interposed between pressure bars 62 and the top surfaces of the panels as shown in FIGS. 2 and 4. Sealing strips 64 may be secured such as by bonding to the upper surfaces of the panels during fabrication in the shop. As an alternative, sealing strips 64 may be secured such as by bonding to the underside of pressure bars 62. Additionally, if desired, the sealing strips may be separately inserted in the field.

When the pressure bars 62 and sealing strips 64 are placed on the panels, pressure blocks 28 are rotated to extend transversely of the pressure bars as shown in FIG. 4. To complete securement of the panels, wedges 40 are merely rotated transversely of pressure blocks 28 and then hammered transversely of the stud as permitted by the elongated wedge slots 46. Wide ends 42 of the wedges are employed as a hammering face, and it will be appreciated that the inclined wedge shape of the wedges will cause them to be cammed downwardly by engagement with the washer and head assembly at the top of the studs. This will apply a downward wedging force on the pressure blocks 48 which in turn will be transmitted to the pressure bars 62 and ultimately the panels to firmly secure the panels against the ribs.

Interengagement of teeth 48, 50 on the wedge and pressure blocks will retain these members in their operative wedging relationship to thus insure that the panels will be firmly secured against the ribs against dislodgment. Spacer tubes 22, all of which have the same length, insure that the distance between bolt head 24 and the top surface of the rib will be uniform for all the wedging assemblies and thus uniform wedging pressure will be applied to the panels. Thus in fabrication in the shop, the proper distance between the stop 24 and the upper surface of the rib is quickly and accurately determined merely by placing a tube 22 precut to a predetermined length to give the desired spacing. Although not shown tube 22 may be constructed in frangible, cylindrical sections to enable different tube lengths to be quickly obtained depending on the type of installation. Additionally, tube 22 serves as a bearing for the wedge and pressure block while also providing a protective casing for bolt 16.

When it is desired to release the wedge assemblies for example in dismantling the building, wedges 40 are merely hammered to withdraw them from their advanced wedging position whereupon pressure bars 62 and panels 12 will be freed for easy removal from beneath the pressure blocks. After removal of the panels and pressure bars, the wedge assemblies will remain installed on the ribs for subsequent use upon re-erection of the building.

Figure 5:
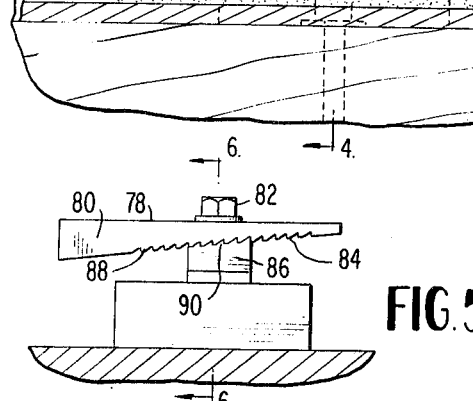
FIG. 5 is a side elevational view of a modified wedge assembly.
Figure 6:
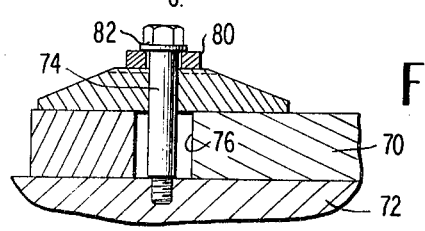
FIG. 6 is a cross sectional view taken generally along lines 6—6 of FIG. 5.

In addition to forming the improved joint described above, the wedge assembly of the present invention has applicability elsewhere. Referring now to FIGS. 5 and 6, there is shown a modification of the wedge assembly employed to secure two elements 70 and 72 which need not be the ribs and panels described above. In the present modification, the spacer tube is omitted and the stud is shown in the form of a threaded bolt 74 secured in element 72 through an aperture 76 provided in element 70. Additionally, the top surface 78 of the wedge 80 in the presently described embodiment is formed to extend in a horizontal plane to provide enhanced contact between the top surface 78 and the washer 82. The underside 84 of the wedge extends at an incline corresponding to the top face of the pressure block 86 which is also inclined. Moreover, the spacing of the teeth 88 and 90 in the present embodiment is less than the spacing of the teeth in the above described embodiment. This will compensate for any slack that might result from the absence of the resilient sealing strips in the instant embodiment. The block and wedge members are installed and operated generally in the same manner as the above-described embodiment.

Although the structural members 10 have been shown as made from wood, it will be appreciated that the wedge assembly of the present invention may be incorporated in structural members made from metal such as steel, iron or an alloy as well as plastic structural members. In addition, the structural members 10 may have various shapes besides the rectangular cross-sectional shape illustrated. For example, the structural members may have recesses in their top surfaces with the wedge assemblies installed in the recesses.

Where applicable, the disclosure of my copending U.S. patent application is hereby incorporated by reference into this application.

Other modifications readily apparent from the foregoing description and associated drawings, although not specifically mentioned herein, will nevertheless be included within the spirit and scope of the invention as indicated in the appended claims.

I claim:

1. A structural rib for use as a beam or the like in a building comprising: an elongated body having a face dimensioned to receive panel elements or the like, a releasable securing means including a stud projecting from said face, a pressure member received on said stud for slidable and rotatable movement relative to said stud, a wedge having an elongated slot received about said stud outwardly of said pressure member for slidable and rotatable movement relative to said stud and said pressure member, and a stop on said stud outwardly of said wedge for preventing movement of said wedge off the stud, said stud being sufficiently dimensioned to permit the pressure member to be spaced from said rib face to receive therebetween a panel element or the like and to permit the wedge to be moved transversely of the stud to apply pressure to the pressure member for purposes of fastening a panel member or the like to said rib face, said releasable securing means being provided on the rib at a plurality of spaced locations along said face thereof.

2. A wedge assembly comprising a support member, a stud projecting from the support member, a pressure member received about the stud for slidable movement along and rotatable movement about said stud, a wedge having an elongated slot received about said stud outwardly of said pressure member for mounting the wedge on the stud for rectilinear and rotational movement relative to the stud, and a stop on the stud outwardly of the wedge to be engageable with the wedge for permitting the wedge to apply a wedging force to the pressure member to wedge the pressure member towards its support member for securing an element between the pressure member and the support member, said pressure member having a surface facing said wedge and a plurality of teeth formed in said surface, said wedge having a surface facing said surface of said pressure member and having a plurality of teeth complementary to the teeth in said pressure member for engagement therewith to releasably maintain the wedge and the pressure member in fixed securing position, said teeth in the pressure member extending longitudinally of the pressure member at locations spaced transversely of the pressure member, said teeth in the wedge extending transversely of the wedge at locations spaced longitudinally of the wedge, said teeth in the wedge and pressure member having outer chamfered portions providing generally horizontal planar surfaces in the teeth.

3. The wedge assembly defined in claim 2 wherein said wedge and pressure member are formed from aluminum.

4. A wedge assembly comprising a support member, a stud projecting from the support member, and having a stop thereon, a pressure member received about the stud inwardly of the stop for slidable movement along the stud toward said support member, a wedge having an elongated slot received about the stud between the stop and the pressure member for mounting the wedge for rotational and rectilinear movement relative to the stud such that an element may be secured between the pressure member and the support member by driving the wedge transversely of the stud with the wedge engaging the stop to apply a wedging force on the pressure member in the direction of the support member, said pressure member having opposite surface portions facing said wedge and being relieved in a direction away from the wedge to facilitate rotation of the wedge relative to the pressure member.

5. The wedge assembly defined in claim 4 wherein said pressure member has a surface portion positioned between said relieved portions and having a plurality of teeth extending in one direction and projecting upwardly therefrom at a slight angle, and said wedge has a surface engageable with the pressure member and having a plurality of teeth complementary to the teeth in said pressure member to be engageable therewith for purposes of securing the wedge relative to the pressure member during securement of an element between the pressure member and the support member.

6. The wedge assembly defined in claim 5 wherein the extremities of said teeth on said wedge and pressure member are chamfered to provide generally horizontal planar surfaces on said teeth.

7. A wedge assembly comprising a support member, a stud projecting from the support member, a pressure member having an aperture receiving the stud to mount the pressure member for slidable movement along the stud and rotatable movement about said stud, the aperture in the pressure member being greater in cross dimension than the largest width dimension of the stud to permit the pressure member to rotate about the stud, a wedge having an elongated slot receiving said stud outwardly of said pressure member, the width of said slot being greater than the largest width dimension of the stud thereby mounting the wedge on the stud for rectilinear movement transverse to the stud as well as rotational movement about and relative to the stud, and a stop on the stud outwardly of the wedge engageable with the wedge for permitting the wedge to apply a wedging force to the pressure member to wedge the pressure member towards said support member for securing an element between the pressure member and the support member, said pressure member having a first dimension extending in one direction in a first plane overlying and generally parallel to the support member, and a second dimension extending in a direction at right angles to said first direction and lying in the said first plane, said wedge having a length measured in a plane generally parallel to said first plane greater than said second dimension of said pressure member such that the wedge is rotatable relative to the stud and pressure member to position the length of said wedge transversely to said first direction of said pressure member and with the wedge member extending beyond the pressure member for facilitating wedging action as well as loosening wedging engagement between the wedge and pressure member.

8. The wedge assembly defined in claim 7 wherein said pressure member has a plurality of teeth formed in the top surface thereof and wherein said wedge has a plurality of teeth complementary to the teeth formed in said pressure member for engagement with the teeth in the pressure member to releaseably maintain the wedge and pressure member is fixed securing position.

9. The wedge assembly defined in claim 8 wherein said teeth in the pressure member extend longitudinally of the pressure member at locations spaced transversely of the pressure member and wherein said teeth in the wedge extend transversely of the wedge at locations spaced longitudinally of the wedge.

10. The wedge assembly defined in claim 8 wherein portions of said pressure member facing the wedge are relieved away from the wedge to facilitate rotation of the wedge about the stud.

11. The wedge assembly defined in claim 7 further including a tube positioned about the stud and extending longitudinally thereof between said stop and said support member.

12. The wedge assembly defined in claim 7 wherein said wedge and said pressure member are both elongated, said pressure member having a length extending in said first direction and a width extending in said second direction, said wedge having a width measured in said second plane less than the length of said pressure member so that the wedge may be rotated relative to the stud and pressure member into a position extending transversely of the pressure member and beyond opposite sides of the pressure member.

References Cited

UNITED STATES PATENTS

| 1,236,852 | 8/1917 | McKay | 249—193 X |
| 1,607,072 | 11/1926 | Gremel | 249—192 X |
| 1,682,740 | 9/1928 | Colt | 249—219 X |
| 3,057,034 | 10/1962 | Helmick | 249—219 X |
| 3,404,501 | 10/1968 | Von Wedel | 52—127 X |

FOREIGN PATENTS 39,991  1/1937  Netherlands.

PRICE C. FAW, JR., Primary Examiner

U.S. Cl. X.R.

52—127, 463; 254—104; 287—20.92